Nov. 25, 1958 S. J. YRAGUI 2,862,169
CONTROL CIRCUIT FOR AUTOMATIC STEERING DEVICES
Filed Nov. 6, 1956
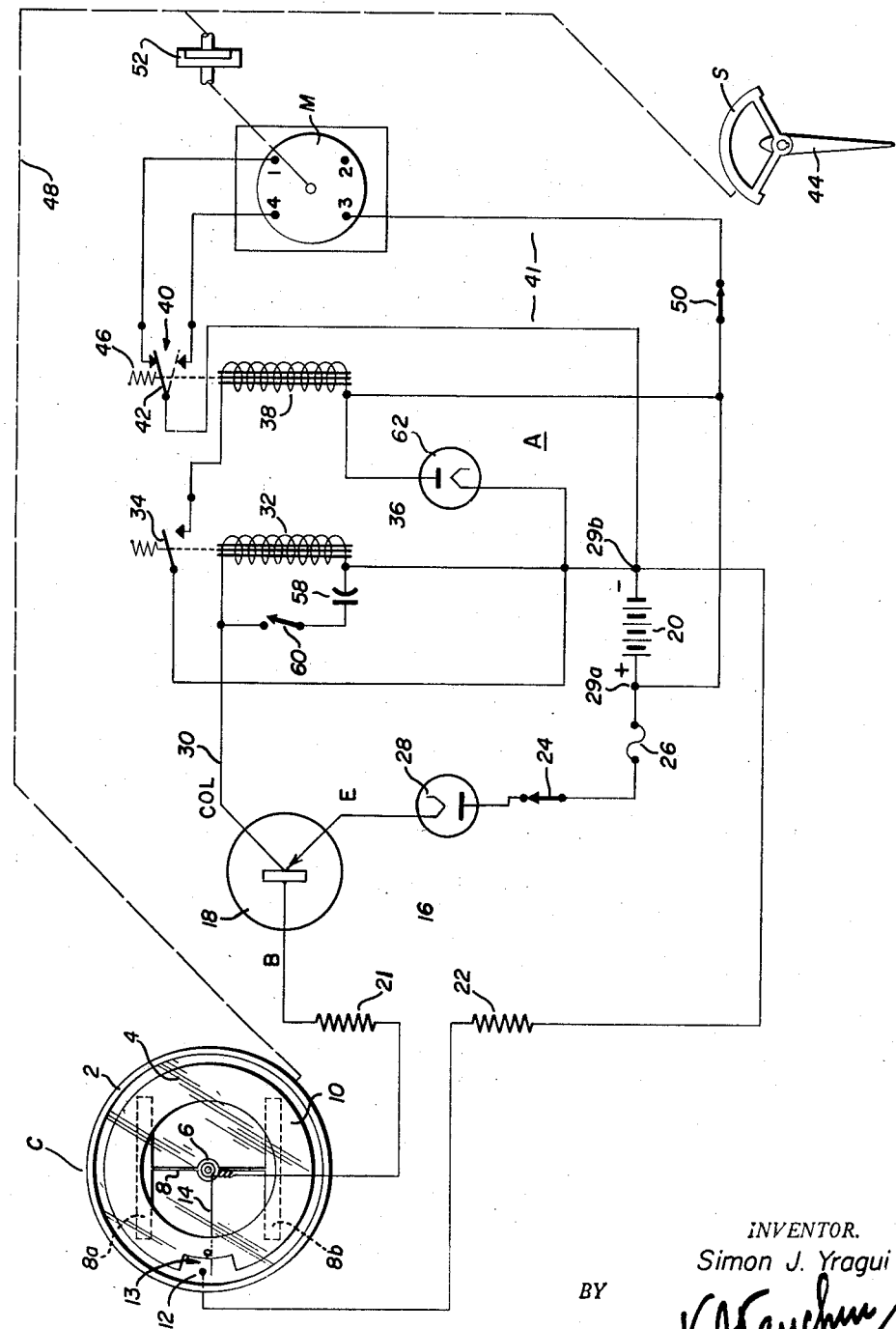
INVENTOR.
Simon J. Yragui
BY United States Patent Office 2,862,169
Patented Nov. 25, 1958

2,862,169

CONTROL CIRCUIT FOR AUTOMATIC STEERING DEVICES

Simon J. Yragui, San Francisco, Calif., assignor of one-half to Walter H. Lunardini, San Francisco, Calif.

Application November 6, 1956, Serial No. 620,612

1 Claim. (Cl. 318—489)

The present invention relates to automatic steering devices for moving vessels, such as motor boats. More particularly the present invention relates to automatic steering devices, of the type referred to, which employ a magnetic compass element to adjust the position of the steering means of a vessel in response to changes in the course of said vessel.

Automatic steering devices of the type referred to, comprise generally a compass unit which senses any changes in the course of a vessel, a motor unit arranged to actuate the steering means of the vessel and an electric circuit arrangement which controls the operation of the steering motor in accordance with directional changes sensed by the compass unit, in such a manner that the resultant changes in the position of the steering means compensate for undesired changes in the course of the vessel. In the particular type of automatic steering mechanism to which the present invention relates, the steering motor is a reversible motor that turns continuously when the arrangement is in use, and which changes its direction of operation in brief intervals whenever the vessel has deviated from its predetermined course by a limited margin, irrespective of whether the deviation is caused by weather conditions or by the effect of the motor upon the steering means. For this purpose the compass unit is provided with a pair of relatively movable electric contacts which lie in a control circuit for the steering motor and which will close or open depending upon the direction in which the vessel departs from its predetermined course. One of the contacts is carried by the casing of the compass and hence turns with, and follows any changes in the course of, the vessel, while the other contact is secured to a magnetic element of the compass and therefore remains substantially stationary in space. Hence, whenever the vessel turns in one direction the contacts will move toward each other until they engage and close the control circuit, and vice versa, whenever the vessel turns in the opposite direction the contacts will move apart and interrupt the control circuit. Closure of the contacts is arranged to permit current flow in the circuit of a relay which upon energization actuates a switch in the power circuit of the steering motor in such a manner that the operation of the motor is reversed causing the steering means of the vessel to move in a manner that will offset the initial deviation of the vessel from its predetermined course; and as the vessel turns in the opposite direction as a result of the change in the position of its steering means, the contacts of the compass unit move apart and block the flow of current in the circuit of the relay causing return of the motor control switch to its initial position. As a result thereof the motor is again reversed which causes the steering means of the vessel to move in a manner that compensates for any excessive correction in the course of the vessel as effected by the first described reversal in the operation of the steering motor. The resultant change in the course of the vessel again causes closure of the contacts in the compass unit initiating another cycle in the operation of the automatic steering device.

By pivotally mounting the casing of the compass unit and by applying the rotary output of the reversible steering motor to the compass casing in such a manner that the casing will always turn in a direction opposite to the initiated corrective rotation of the steering means, i. e. in the same direction as the corrective movement of the vessel, engagement of the contact points in the compass unit, once established, is limited to a minimum period and will be terminated almost as soon as the corrective change in the course of the vessel commences; and vice versa, the contact points once separated, will be moved toward each other for renewed contact once corrective movement of the vessel in the opposite direction has been initiated by separation of the contact points. In this manner the corrective re-adjustment in the position of the steering means and the consequent corrective changes in the course of the vessel may be made to occur in rapid succession in spite of the mass of the boat and the consequent inertia of its movements, so that the vessel may be kept at a predetermined course without noticeable oscillations.

It is an object of my invention to provide an electric control circuit, for automatic steering devices of the type referred to, that combines simplicity with effectiveness and dependability in operation.

Another object of my invention is to provide a rugged circuit arrangement, of the type referred to, that is not likely to become defective even after prolonged periods of use under rough weather conditions.

Still another object of my invention is to provide a circuit arrangement, for compass-controlled steering mechanism of the type referred to, that requires but a single source of electric power for its motor, relays, and control circuits.

Yet another object of my invention is to provide, in circuits of the type referred to, means manually operable to selectively control the frequency of motor reversals.

Furthermore, it is an object of the invention to provide means for controlling the sensitivity of response in compass-controlled automatic steering arrangements, of the type referred to.

These and other objects of my invention will be apparent from the following description of the accompanying drawing which illustrates a preferred embodiment thereof by means of a circuit diagram of the control circuit including schematic illustrations of the compass unit, the motor and the steering mechanism.

In the drawing the capital letter C designates the compass unit which controls the operation of a reversible D. C. motor M through a circuit arrangement, collectively identified by the letter A. The motor M in turn operates the steering mechanism S of the boat upon which the compass unit is mounted.

The compass unit comprises an oil-filled metal bowl or casing 2 that is covered by a disk of glass 4 and which is mounted for rotation about a vertical center axis 6. Mounted for free rotation within and relative to the bowl 2 about the center axis 6 thereof is a magnetic structure 8 comprised of two horizontally disposed parallel bars 8a and 8b which carry an annular compass card 10. Attached to the inner face of bowl 2 near the upper end thereof is one contact element 12 of a switch 13 and supported from the magnetic structure 8 at a point near the axis 6 of the compass and extending radially therefrom is the other contact element of the switch 13 which has the form of a thin resiliently flexible wire 14 that remains substantially stationary in space since its magnetic supporting structure is freely rotatable relative to the bowl 2 and will endeavor to retain its position in space under the influence of the magnetism of the earth. By turning the bowl 2 of the compass, such as occurs whenever the boat upon which the compass is mounted, changes its course, the switch element 12 may be brought against the flexible wire 14 effecting electrically conductive closure of the contact elements 12 and 14. The switch 13 lies in the emitter circuit 16 of a transistor 18 that is connected across a suitable source of electric power, such as the battery 20 shown in the drawing, which should preferably be of sufficient strength to operate the motor M for reasons that will presently appear. In circuit 16, however, the current flow must be kept sufficiently light to reduce sparking at the point of contact between the elements 12 and 14 of switch 13 and prevent fusion of the thin flexible wire of element 14 to the contact element 12, which might disrupt the operation of the control arrangement. Resistors 21 and 22 of high ohmic values are therefore connected into the circuit 16 in series with, and at either side of, switch 13. In addition the circuit may include a manually operable master switch 24, a suitable fuse 26 and also a diode 28 to protect the transistor 18 from damage if it is inadvertently connected in the wrong manner to the terminals 29a and 29b of the battery.

The collector circuit of transistor 18 is also connected across the terminals 29a and 29b of battery 20 and forms the power circuit 30 for a relay 32, the arrangement being such that whenever the master switch 24 of the switch elements 12, 14 of compass unit C are open and there is no flow of current in circuit 16, the transistor 18 is for all practical purposes non-conductive with respect to circuit 30 so that the relay 32 remains idle. However, when the switch elements 12 and 14 make contact with each other, while the master switch 24 is closed, the resultant current flow in circuit 16 biases the transistor 18 and renders it conductive with respect to circuit 30. Current will, therefore, flow in circuit 30 and effect energization of the relay 32. The relay 32 is arranged, upon energization, to close a normally open switch 34 in a third circuit 36 that is likewise connected across the terminals 29a and 29b of battery 20 and which, due to the absence of any significant resistances in the circuit will, upon closure of switch 34, sustain a flow of current that is of sufficient strength to energize a relay 38 which is capable of actuating a control switch 40 of the power circuit 41 of motor M. The switch 40 is a two-way switch that is arranged to connect the battery 20 in opposite ways across the motor M such that depending upon its position the motor will turn in one or the opposite direction. With the contact elements 12, 14 of switch 13 in the compass unit C separated from each other and the relays 32 and 38 in de-energized condition, the arm 42 of switch 40 is in the position illustrated in full lines in the drawing wherein the motor M turns in a direction that swings the rudder 44 of the steering mechanism S in a clockwise direction as viewed in the drawing. This causes the boat to turn in a counterclockwise direction and the resultant movement, in space, of the compass unit C moves the switch element 12 toward and into contact with the flexible wire contact 14. When the switch elements 12 and 14 are in electrically conductive contact, however, and the relays 32 and 38 are energized, the latter relay forces the switch arm 42 against the urgency of a suitable restore spring 46 into the position shown in broken lines in the drawing wherein it closes power flow through the motor M in such a manner that said motor turns in the opposite direction which causes the rudder of the steering mechanism S to swing in counterclockwise direction, as viewed in the drawing. In consequence thereof the boat will turn in a clockwise direction which is effective to remove the contact element 12 from the wire contact 14 of the compass switch 13.

To speed up separation or closure of the contact elements 12, 14 of compass switch 13 whenever a corrective adjustment of the steering mechanism has been initiated by the closure or separation respectively of said contact elements, the motor M may be arranged by a suitable mechanical power transmission train, indicated at 48 in the drawing, to turn the pivotally mounted bowl 2 of the compass unit in a direction opposite to the direction in which it turns the rudder of the steering mechanism.

In practice the master switch 24 in emitter circuit 16 of the transistor 18 and a master control switch 50 in the power circuit 41 of motor M is closed, but a clutch 52 in the mechanical power train 48 from the motor to the steering mechanism is disengaged and the steering mechanism is manipulated independently of the automatic steering device until the vessel advances along its proper course. Thereupon the clutch 52 is reengaged. Assuming the switch elements 12, 14 in compass unit C to be separated at the time, which means that the arm 42 of the control switch 40 in the power circuit of the motor is in the position illustrated in full lines, the motor will turn in such a direction that the rudder of the steering mechanism swings in clockwise direction, as viewed in the drawing, which causes the vessel to turn in counterclockwise direction. At the same time the motor turns the bowl 2 of the compass unit through power train 48 in a counterclockwise direction. The defined movements of the vessel and the compass bowl both cooperate to bring about an early closure of the switch elements 12, 14 in compass unit C. The resultant current flow in circuit 16 renders the transistor 18 conductive with regard to its collector circuit 30, so that the relay 32 is energized and effects closure of switch 34. This in turn effects energization of the relay 38, which moves the arm 42 of switch 40 against the urgency of spring 46 from the position shown in full lines into the position indicated by a broken line. As a result the power of battery 20 is applied to the motor M in an opposite direction and the motor reverses its operation. This turns the rudder of the steering mechanism in a counterclockwise direction which is effective to correct the course of the vessel in a clockwise direction. At the same time the motor turns the compass bowl 2 to which contact 12 of switch 13 is attached, in a clockwise direction, and both the clockwise turn of the boat, and hence of the compass bowl, as effected by the steering rudder, and the clockwise rotation of the compass bowl as effected directly by the motor cooperate to separate the switch elements 12, 14 in compass unit C before the counterclockwise rotation of the steering rudder had sufficient time to effect an excessive overcorrection of the vessel's course. The exact moment when the switch elements 12, 14 lose contact with each other is retarded or accelerated by external factors that operate to interfere with the course of the boat and which would normally drive it off its intended course, such as changes in the wind direction, waves, and/or water currents. As soon as the switch elements 12, 14 have lost conductive contact with each other, the transistor 18 returns to its non-conductive condition with respect to circuit 30, and the relay 32 is de-energized permitting switch 34 to open. This in turn causes de-energization of the relay 38 which permits the restore spring 46 to return the arm 42 of direction control switch 40 in the power circuit 41 of the motor M to its initial position. As a result thereof the motor reverses operation and turns the steering rudder in clockwise direction so as to compensate for any over-correction in the course of the vessel that may have occurred in the directly preceding phase of operations either by excessive counterclockwise rotation of the steering mechanism or by external factors, such as waves, water currents, and/or sudden changes in the wind direction.

The described reversals in the operation of motor M with the consequent reversals in the position of the steering rudder occur many times per minute so that there will never be sufficient time for significant departures from the intended course of the vessel to occur, and the vessel will move steadily along its predetermined course without noticeable oscillations. When the weather is calm the number of rudder reversals required per minute to maintain the vessel on its course will be less than under rough weather conditions when waves and squalls of wind and rain may effect sudden changes in its course. In accordance with my invention I provide means operable to selectively retard or accelerate the compensating reversals in the operation of the steering motor. For this purpose I arrange a condenser 58 parallel with the coil of relay 32 and I provide means in the form of a manually operable switch 60 to effectively connect the condenser 58 into, or disconnect it from, the circuit 30. When the condenser 58 is connected across the coil of the relay 32 by closure of switch 60, the time required upon closure of the campass switch 13 for building up an operating potential across the relay coil is longer to a degree depending upon the size of the condenser 58. Vice versa, when the current flow in circuit 30 is blocked by the separation of the contacts 12, 14 of compass switch 13, the time for the potential across the coil of relay 32 to disappear and permit switch 34 to open, is extended due to the voltage stored in condenser 58. Thus, with the condenser 58 connected into circuit 30, the motor will respond less quickly to closure or separation of the contact elements 12, 14 of the compass switch 13, which may be adequate under calm weather conditions. On the other hand, with switch 60 open, the sensitivity of the control arrangement of my invention is increased and it will dependably hold a boat to its proper course under most unfavorable weather conditions. To be able to adjust the sensitivity of the control arrangement of my invention very precisely to varying weather conditions, it may be of advantage to employ a variable condenser in place of the condenser 58 shown in the drawing.

In a practical embodiment of my invention constructed in accordance with the diagram shown in the drawing I employed the following components:

| | |
|---|---|
| Resistor 20 | 37K ohms. |
| Resistor 22 | 100K ohms. |
| Transistor 18 | CK722. |
| Diode 28 | IN34A. |
| Diode 62 | IN54A. |
| Relay 32 | 10K ohms. |
| Relay 38 | Guardian Ser. 200. |
| Condenser 58 | 10 mfd. |
| Battery | 12 volts. |

The control arrangement of my invention is exceedingly simple compared with conventional control circuits for automatic navigating arrangements of the type here under consideration. It is therefore very rugged and is not likely to fail even under very unfavorable weather conditions. It requires but one source of power, where comparable systems of the prior art required separate sources of power for the compass controlled circuit, the power circuits for the relays, and the power circuit for the motor. Moreover the automatic steering arrangement of my invention provides means for adjusting its sensitivity so that it may be adapted to different weather conditions.

While I have explained my invention with the aid of a particular embodiment thereof, it will be understood that the invention is not limited to the specific constructional details shown and the specific electrical quantities of its components described hereinbefore, which may be departed from without departing from the scope and spirit of the invention.

I claim:

In compass-controlled automatic steering devices for moving vessels a circuit arrangement for the control of a reversible motor arranged to actuate the steering means of the vessel, comprising a relay, a power circuit for said relay including a source of electric power, a normally non-conductive transistor connected into said power circuit in series with said relay, a control circuit for said transistor connected across said some source of electric power and including a compass-actuated control switch and a high ohmic resistor in series with said switch, said control circuit being effective upon closure of said compass-actuated switch to render said transistor conductive with respect to the power circuit of said relay and cause energization of said relay, a power circuit for said motor including said same source of electric power, a switch in the power circuit of the motor operative in response to energization of said relay to reverse the manner in which said motor is connected across said source of power and thus reverse operation of said motor, and means for selectively adjusting the response sensitivity of the control arrangement including a condenser connected across said relay.

References Cited in the file of this patent

UNITED STATES PATENTS

| | | |
|---|---|---|
| 1,982,702 | Sperry | Dec. 4, 1934 |
| 2,089,914 | Freeman | Aug. 10, 1937 |
| 2,289,242 | Chance et al. | July 7, 1942 |
| 2,774,021 | Ehret | Dec. 11, 1956 |
| 2,789,164 | Stanley | Apr. 16, 1957 |